United States Patent Office 2,906,783
Patented Sept. 29, 1959

---

2,906,783

STABILIZATION OF CHLORINATED HYDROCARBON SOLVENTS WITH AZINES

Roger Floyd Monroe and Donald Edward Rapp, Midland, Mich., assignors to The Dow Chemical Company, Midland, Mich., a corporation of Delaware No Drawing. Application February 6, 1958
Serial No. 713,524

3 Claims. (Cl. 260—652.5)

The present invention relates to stabilizers and is more particularly concerned with stabilization of chlorinated aliphatic hydrocarbon solvents employed, for example, in solvent cleaning.

In the art of solvent cleaning, particularly in vapor degreasing metals, for example, the chlorinated hydrocarbons have been employed to the almost total exclusion to other solvents. These compounds, desirable because of their substantial high solvent action under the conditions of use and relative freeness from fire hazards, have major drawbacks such as their instability under acid conditions. The acid conditions cause the degradation or deterioration of the chlorinated hydrocarbons, the degradation being in many instances, acids. Thus, the degradation is frequently autocatalytic. Further, the formation of these acids is catalyzed by exposure of the solvent or its vapors to air and light.

It is, therefore, an object of the present invention to provide a stabilizer which, when present in minor quantities in chlorinated aliphatic hydrocarbon solvents, will maintain the neutral, or near neutral, condition of these solvents, thereby prolonging their useful life. Another object of the present invention is to provide a stabilizer which, in minor amounts, will stabilize the chlorinated hydrocarbon solvent against acid conditions, light and oxygen. A further object of the present invention is to provide a stabilizer which will protect the solvent under acid conditions commonly encountered in these systems. A still further object of the present invention is to provide a stabilizer which will not become immobilized or bound in the liquid phase by reaction with acids. These and other objects will become apparent to those skilled in the art from the following specification and claims.

It has now been found that the addition of an azine having the formula

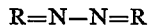

wherein each R represents an independently selected alkylidene radical, the total number of carbon atoms being from 4 to 10, inclusive, to a chlorinated hydrocarbon solvent will inhibit the deterioration of the hydrocarbon solvent. Good results have been obtained when employing from 500 to 5000 parts of the azine compound per million parts of the chlorinated aliphatic hydrocarbon solvent.

Azines which may be employed in accordance with the present invention for the protection and stabilization of chlorinated aliphatic hydrocarbon solvents in both the liquid and vapor phases are, for example, acetal azine, propionaldehyde azine, butyraldehyde azine, and the like.

Various hydrocarbon solvents may be stabilized in accordance with the present invention, such as, for example, methyl chloroform, carbon tetrachloride, dichloroethylene, trichloroethylene, perchloroethylene, methylene chloride, and the like.

The following examples are illustrative of the present invention but are not to be construed as limiting.

*Example 1*

A commercial trichloroethylene solvent containing 300 parts by weight of butylene oxide, 2500 parts of isopropyl acetate and 1500 parts of trimethylpentene per million parts of trichloroethylene and the commercial solvent containing in addition, 1180 parts of acetal azine, were heated for 48 hours at the reflux temperature in the presence of incandescent light, iron and oxygen. The formulations were titrated before and after the test to determine the acid content. The results were as follows:

|  | Parts per million HCl | |
|---|---|---|
|  | Before test | After test |
| Trichloroethylene formulation containing acetal azine | 20 | 11.0 |
| Check (trichloroethylene formulation without acetal azine) | 20 | Over 200 |

*Example 2*

20 ml. samples of the trichloroethylene formulations of Example 1, before and after the accelerated oxidation test of Example 1, were refluxed with 50 ml. of 0.1 N HCl for five minutes. Upon completion of the test the samples were diluted with 25 ml. of water containing phenolphthalein as indicator and the samples back-titrated with 0.1 N NaOH. The results are indicated below.

|  | Acid acceptance as percent NaOH | |
|---|---|---|
|  | Before oxidation test | After oxidation test |
| Solvent and acetal azine | 0.015 | 0.068 |
| Check | 0.015 | 0 |

It is an important feature of the invention that the compounds of the present invention maintain an effective concentration of stabilizer in both the vapor and liquid phase of the degreasing operation, thus protecting the solvent and its various additives in both phases. Further, the compounds are recoverable with the solvent in clean-up operations.

We claim:
1. A stabilized chlorinated aliphatic hydrocarbon solvent comprising from 500 to 5000 parts by weight of an azine having the formula

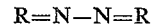

wherein R represents an independently selected alkylidene radical, the total number of carbon atoms being from 4 to 10, inclusive, per million parts of chlorinated solvent.
2. A solvent as set forth in claim 1 wherein the azine is acetal azine.
3. A solvent as set forth in claim 1 wherein the chlorinated hydrocarbon is trichloroethylene.

References Cited in the file of this patent

UNITED STATES PATENTS

| 2,094,367 | Missbach | Sept. 28, 1937 |
| 2,691,642 | Faulkner | Oct. 12, 1954 |
| 2,757,163 | Bowers | July 31, 1956 |